United States Patent [19]
Baade et al.

[11] Patent Number: 5,539,065
[45] Date of Patent: Jul. 23, 1996

[54] PROCESS FOR THE PRODUCTION OF $C_4-C_{16}$ ALKYL RUBBERS USING THE SLURRY PROCESS

[75] Inventors: Wolfgang Baade, Odenthal; Gerhard Langstein, Kürten, both of Germany; Judit Puskas, Ontario, Canada

[73] Assignee: Bayer AG, Leverkusen, Germany

[21] Appl. No.: 504,264

[22] Filed: Jul. 19, 1995

[30] Foreign Application Priority Data

Jul. 28, 1994 [DE] Germany ............... 44 26 756.8

[51] Int. Cl.⁶ .................. C08F 2/14; C08F 236/04
[52] U.S. Cl. .................. 526/74; 526/237; 526/339; 526/185
[58] Field of Search .................. 526/74, 237, 348.7, 526/339, 185

[56] References Cited

U.S. PATENT DOCUMENTS

| | | | |
|---|---|---|---|
| 2,438,340 | 3/1948 | Johnson | 526/237 |
| 2,772,255 | 11/1956 | Ernst et al. | 526/237 |
| 2,781,334 | 2/1957 | Welch et al. | 260/80.7 |
| 2,844,569 | 7/1958 | Green et al. | 260/85.3 |
| 3,135,721 | 6/1964 | Small et al. | 526/74 |
| 3,433,775 | 3/1969 | Ray et al. | 526/348.7 X |
| 3,948,868 | 4/1976 | Powers | 260/80.7 |
| 4,139,695 | 2/1979 | Thaler et al. | 526/308 |

FOREIGN PATENT DOCUMENTS

| | | |
|---|---|---|
| 0341012 | 11/1989 | European Pat. Off. . |
| 0397081 | 11/1990 | European Pat. Off. . |
| 0537660 | 4/1993 | European Pat. Off. . |
| 852304 | 10/1952 | Germany . |
| 863262 | 1/1953 | Germany . |

*Primary Examiner*—Fred Teskin
*Attorney, Agent, or Firm*—Connolly & Hutz

[57] ABSTRACT

The production of $C_4-C_{16}$ alkyl rubbers using the slurry process by copolymerisation of isoolefins having 4 to 16 carbon atoms with conjugated diolefins having 4 to 6 carbon atoms and/or cationically polymerisable, mono- or polyunsaturated organic compounds having 4 to 16 carbon atoms in the presence of methyl chloride and in the presence of Friedel-Crafts catalysts proceeds particularly advantageously by performing copolymerisation in the presence of linear, branched and/or cyclic alkanes.

4 Claims, No Drawings

PROCESS FOR THE PRODUCTION OF C$_4$–C$_{16}$ ALKYL RUBBERS USING THE SLURRY PROCESS

The present invention relates to a process for the production of C$_4$–C$_{16}$ alkyl rubbers using the slurry process by copolymerisation of isoolefins having 4 to 16 carbon atoms with conjugated diolefins having 4 to 6 carbon atoms and/or cationically polymerisable mono- or polyunsaturated organic compounds having 4 to 16 carbon atoms in the presence of methyl chloride and in the presence of Friedel-Crafts catalysts.

Butyl rubber is today customarily produced by low temperature polymerisation of isobutene with isoprene using the so-called slurry process in the presence of aluminium trichloride as catalyst and in the presence of methyl chloride as the continuous phase at −90° to −100° C. (see Ullmann's Encyclopedia of Industrial Chemistry, volume A23, 1993). An advantage of this process is an elevated solids content with a simultaneously low viscosity of the slurry system. A disadvantage of this process when performed on an industrial scale is the appearance of fouling on reactor walls and cooling devices, so greatly hindering the removal of the heat of polymerisation. As a consequence, a continuously operated reactor must be taken out of operation for cleaning after only a short period of service.

It is also possible to produce butyl rubber by solution polymerisation (for example DE-OS 23 28 541). In this solution process, virtually no fouling is formed on the reactor walls and cooling devices. However, in the solution process, the reaction solution becomes very viscous at even low polymer concentrations, which has a disadvantageous effect on mixing and the removal of heat.

In order to prevent fouling on the reactor walls, it has been attempted to perform polymerisation in the presence of small quantities of isobutene/styrene block copolymers (U.S. Pat. No. 4,252,710; U.S. Pat. No. 4,358,560 and U.S. Pat. No. 4,474,924). However, the addition of small quantities of isobutene/styrene block copolymers has a negative effect on the product and application technological properties of butyl rubbers produced in this manner.

The object of the present invention is thus to provide a process for the production of C$_4$–C$_{16}$ alkyl rubbers, in particular butyl rubber, in which the stated disadvantages of fouling on the reactor walls and cooling devices in the slurry process are considerably reduced and in which the slurry system, with its low viscosity, is simultaneously retained. A further object of the present invention is that the products produced according to the process should have the same properties as those butyl rubbers produced using the known standard process.

The present invention thus provides a process for the production of C$_4$–C$_{16}$ alkyl rubbers using the slurry process by copolymerisation of isoolefins having 4 to 16 carbon atoms with conjugated diolefins having 4 to 6 carbon atoms and/or cationically polymerisable, mono- or polyunsaturated organic compounds having 4 to 16 carbon atoms in the presence of methyl chloride and in the presence of Friedel-Crafts catalysts at temperatures of −70° to −105° C. and at pressures of 1 to 10 bar, which process is characterised in that copolymerisation is performed in the presence of 1 to 20 wt. %, relative to the continuous phase, of linear, branched and/or cyclic alkanes having 4 to 8 carbon atoms.

Isoolefins having 4 to 16, preferably 4 to 12 carbon atoms which may be used in the process according to the invention are: isobutene, 2-methylbutene, 3-methyl-1-butene, 4-methyl-1-pentene and β-pinene, preferably isobutene and 2-methylbutene, particularly preferably isobutene.

Conjugated diolefins having 4 to 6 carbon atoms which may be considered for the process according to the invention are: butadiene, isoprene, piperylene, 2,3-dimethylbutadiene, 2,4-dimethyl-1,3-pentadiene, cyclopentadiene, methylcyclopentadiene and 1,3-cyclohexadiene, preferably butadiene, isoprene, piperylene and 2,3-dimethylbutadiene, particularly preferably isoprene.

Cationically polymerisable, mono- or polyunsaturated organic compounds having 4 to 16, preferably 4 to 10 carbon atoms, which are suitable for the process according to the invention are: styrene, p-methylstyrene, divinylbenzene and dimethylfulvene, preferably styrene, p-methylstyrene and divinylbenzene, particularly preferably p-methylstyrene and divinylbenzene.

The named isoolefins are used in the process according to the invention in a quantity of 90 to 99.5 wt. %, preferably of 95 to 99.5 wt. %. The cationically polymerisable, unsaturated organic compounds are added in a quantity of 10 to 0.5 wt. %, preferably of 5 to 0.5 wt. %, relative to the sum of all monomers, in the process according to the invention.

As already mentioned, the process according to the invention is performed in the presence of methyl chloride and in the presence of Friedel-Crafts catalysts. The quantity of methyl chloride used is usually 60 to 90 wt. %, preferably 67 to 80 wt. %, related to the sum of methyl chloride, alkanes and monomers.

Suitable Friedel-Crafts catalysts for the process according to the invention are in particular aluminium halides, such as aluminium trichloride, boron halides, such as boron trichloride, titanium halides, such as titanium tetrachloride, or tin halides, such as tin tetrachloride. Further Friedel-Crafts catalysts which may be used are any known alkyl, dialkyl and trialkyl compounds having 1 to 15 carbon atoms which may be derived from the above-stated halides, together with hydrogen chloride or mixtures of the above-stated catalysts. Examples which may, in particular, be cited are: dimethylaluminium chloride, diethylaluminium chloride, ethylaluminium sesquichloride, ethylaluminium dichloride, diisobutylaluminium chloride, isobutylaluminium dichloride, octylaluminium dichloride, preferably ethyl-aluminium chloride and octylaluminium chloride.

Any type R1, R2, R3, R4C compounds producing carbocations may moreover be used as initiators in combination with the above-stated Friedel-Crafts catalysts. The residues R1 to R3 may here be saturated and unsaturated aliphatic residues having 1 to 10, preferably 1 to 4 carbon atoms, together with aromatic groups having 6 to 16, preferably 6 to 10 carbon atoms. R4 may denote halogen, alkoxy, pseudohalogen together with ester groups with aliphatic and aromatic residues. Residues R1 to R3 which may in particular be cited are: methyl, ethyl, propyl, butyl, pentyl, hexyl, heptyl, octyl, phenyl and benzyl.

Aluminium trichloride is very particularly preferably used as the Friedel-Crafts catalyst.

The stated compounds producing carbocations and the Friedel-Crafts catalysts are known and are, for example, described in: J. P. Kennedy and B. Ivan, Carbocationic Macromolecular Engineering, 1992.

The Friedel-Crafts catalysts are used in quantities of 0.008 to 1, preferably 0.01 to 0.8 wt. %, relative to the sum of monomers.

The process according to the invention is preferably performed at temperatures of −85° to −100° C. and at pressures of 1 to 5 bar.

A vital feature of the invention is that copolymerisation is performed in the presence of linear, branched and/or cyclic alkanes. Alkanes which may be cited by way of example are: pentanes, hexanes, cyclohexane and heptanes, very particularly preferably i-hexane and n-hexane.

The quantity of alkanes is preferably 3 to 13 wt. %, relative to the continuous phase. By definition, the continuous phase is taken to be the sum of the methyl chloride, alkane and monomers used.

The process according to the invention may be performed both continuously and discontinuously.

By way of example, in the discontinuous method, the monomers in methyl chloride are first introduced into a stirred reaction vessel cooled to −90° C. The catalyst dissolved in methyl chloride is then injected to initiate the reaction. Cooling is then increased in order to remove the produced heat of polymerisation. The reaction is performed under protective gas.

In the continuous method, all the reactants are simultaneously introduced by means of an injection nuzzle into a thoroughly mixed reactor which has been cooled to −98° C. to −90° C. The product stream is taken from the reactor by an overflow.

The resultant polymers are finished in the customary manner, for example by precipitation in methanol or water (neutral to alkaline) or by stripping the polymer slurry, i.e. coagulation of the polymer particles with steam and stearates as a coagulation agent. Residual monomers remaining in the product are removed by evaporation. The polymer is then mechanically separated from the water and dried.

The following examples provide a detailed description of the present invention.

EXAMPLES

Example 1

3 ml of a solution of 0.93 g of aluminium trichloride in 125 ml of methyl chloride are added to a mixture cooled to −95° C. prepared from 127 g of methyl chloride, 7 g of n-hexane (99.9%), 60 g of isobutene and 1.6 g of isoprene. Polymerisation is initiated immediately on addition of the catalyst, forming a stable, milky white slurry. As is often the case in batch polymerisations, a temperature rise of 23° C. occurred during polymerisation. The reaction is terminated after 18 s by adding 5 ml of ethanol. Conversion was 86% of theoretical. There was almost no fouling of polymeric compounds to the walls of the reaction vessel, despite the observed temperature rise, which normally considerably increases fouling.

Example 2

Repetition of example 1 with 115 g of methyl chloride and 13.5 g of n-hexane under otherwise identical conditions. Polymerisation was likewise initiated immediately on addition of the catalyst, forming a low viscosity, milky white stable slurry. The reaction was terminated after 19 s by adding 5 ml of ethanol. Conversion was 87%. In contrast to the comparative example without added hexane, no fouling was found.

Example 3

Repetition of example 1 with 121 g of methyl chloride and 8 g of i-hexane. Polymerisation was initiated immediately on addition of 3 ml of a solution of 1.50 g of the catalyst octylaluminium dichloride in 125 ml of methyl chloride, forming a low viscosity, slightly yellowish slurry. The reaction was terminated after 23 s by adding 5 ml of ethanol. Conversion was 83% of theoretical. There was virtually no fouling on the reactor walls, heating element and test specimens of various steels (ASTM 1.4301 and ASTM 1.4306).

Example 4

Repetition of example 1 with 121 g of methyl chloride and 18 g of hexane. The reaction was initiated immediately by adding 3 ml of a solution of 0.91 g of aluminium trichloride in 125 ml of methyl chloride, yielding a low viscosity, milky white slurry with a yellowish tinge. The reaction was terminated after 18 s by adding 5 ml of ethanol. Conversion was 79% of theoretical. No polymer fouling was found on steel test specimens and the reactor walls.

Comparative Example

Repetition of example 1 with 128 g of methyl chloride without the addition of n-hexane. The reaction was terminated after 25 s by adding 5 ml of ethanol. Conversion was 87.5%. As is customary for the present polymerisation, heavy fouling with a thickness of 3 to 5 mm were found on the walls.

We claim:

1. Process for the production of $C_4$–$C_{16}$ alkyl rubbers using the slurry process by copolymerisation of isoolefins having 4 to 16 carbon atoms with conjugated diolefins having 4 to 6 carbon atoms and/or cationically polymerisable, mono- or polyunsaturated organic compounds having 4 to 16 carbon atoms in the presence of methyl chloride and in the presence of Friedel-Crafts catalysts at temperatures of −70° to −105° C. and at pressures of 1 to 10 bar, characterised in that copolymerisation is performed in the presence of 1 to 20 wt. %, relative to the continuous phase, of linear, branched and/or cyclic alkanes having 4 to 8 carbon atoms.

2. Process according to claim 1, characterised in that copolymerisation is performed in the presence of 3 to 13 wt. % of alkanes.

3. Process according to claim 1, characterised in that copolymerisation is performed in the presence of pentanes, hexanes, cyclohexane and/or heptanes.

4. Process according to claim 1, characterised in that copolymerisation is performed in the presence of iso-hexanes and/or n-hexanes.

* * * * *